April 14, 1925.

O. HOVDA

DEVICE FOR DEMONSTRATING ANGULAR MOMENTUM

Filed May 26, 1924

1,533,500

INVENTOR
O. Hovda
BY
ATTORNEYS

Patented Apr. 14, 1925.

1,533,500

UNITED STATES PATENT OFFICE.

OLAF HOVDA, OF EVANSVILLE, INDIANA.

DEVICE FOR DEMONSTRATING ANGULAR MOMENTUM.

Application filed May 26, 1924. Serial No. 716,002.

*To all whom it may concern:*

Be it known that I, OLAF HOVDA, a citizen of the United States, and a resident of Evansville, Vanderberg County, State of Indiana, have invented a new and useful Improvement in Devices for Demonstrating Angular Momentum, of which the following is a full, clear, and exact description.

My invention relates to improvements in devices for demonstrating physical laws, more particularly for exhibiting the conservation of angular momentum or energy of rotation, and it consists in the combinations, constructions, and arrangements herein described and claimed.

An object of my invention is to provide a device of the type mentioned which is comparatively simple in construction, and which can be used by the demonstrator, who himself becomes part of the demonstrating means.

A further object of my invention is to provide a device in the nature of a rotating disc having a low center of gravity, and a relatively broad base.

A further object of my invention is to provide a device consisting of a revolvable disc mounted thereon for supporting the demonstrator, and so constructed that the base and the revolving disc may be used interchangeably, that is to say, the base may be used as a supporting disc, or vice versa.

Other objects and advantages will appear in the following specification, and the novel features of the invention will be particularly pointed out in the appended claims.

My invention is illustrated in the accompanying drawings, forming part of this application, in which—

Figure 1:
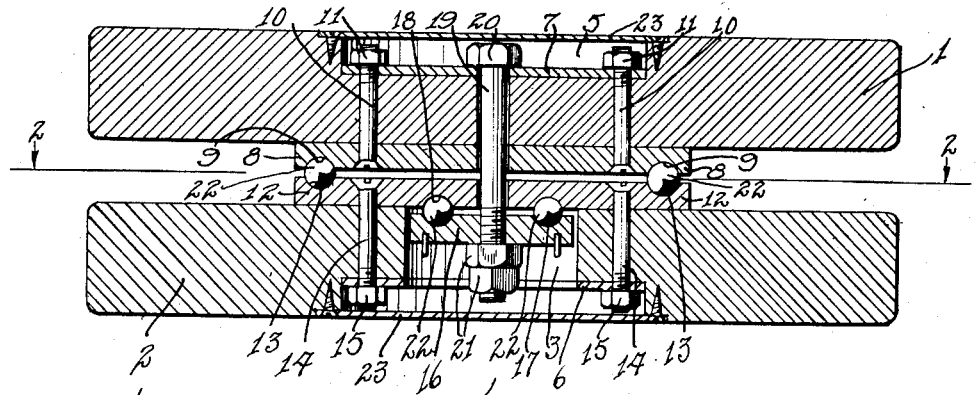
Figure 1 is a section along the line 1—1 of Figure 2.
Figure 2:
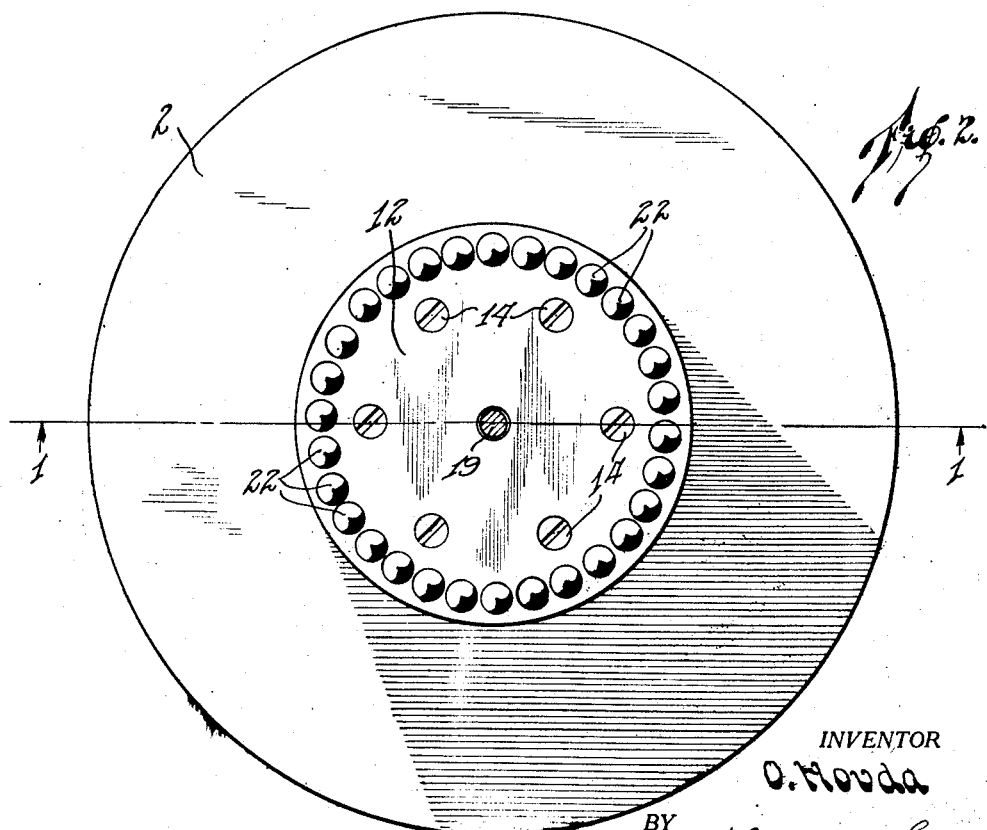
Figure 2 is a section along the line 2—2 of Figure 1.

In carrying out my invention I provide two discs 1 and 2 respectively. These discs are preferably made of wood and may be made of different layers of material, having the grain running in different directions, and the layers being securely held together by glue or other suitable cementing material, so as to form discs which will not warp, and which will not bend under the pressure of the operator's weight. As will be seen from Figure 1, the lower disc 2 is provided with a central bore 3 extending from one side to a recess 4 on the other side. The disc 1 has a recess 5 similar to the recess 4. A ring 6 is provided in the recess 4, while a plate 7 is disposed in the recess 5 of the disc 1.

Between the discs is a bearing plate 8 of metal, which has a circular groove 9. The bearing plate 8 is secured to the disc 1 by means of bolts 10, which are countersunk, and which pass through the bearing plate 8, the disc 1, and the plate 7, and are secured by nuts 11.

Similarly the plate 2 is provided with a bearing plate 12 having a circular groove 13 registering with the groove 9. This bearing plate is secured to the disc 2 by means of bolts 14, which are countersunk, and which are provided with nuts 15 that are designed to bear against the ring 6.

Disposed within the central recess 3 is a bearing plate 16 having a circular groove 17 arranged to register with the circular groove 18 in the bearing plate 12. A screw bolt 19 is provided with a head 20 which bears on the plate 7, and which passes through the plate, the disc 1, the bearing plates 8 and 12, and is threaded to the plate 16. Nuts 21 are provided for locking the plate 16 in its adjusted position. Antifriction balls 22 are disposed between the bearing plates 8 and 12, and 16 and 12. Dust plates 23 are provided for covering the recesses 4 and 5, these dust plates being countersunk so as to present a smooth surface on the exterior face of either of the discs 1 and 2. The construction just described is one example of the way in which the rotatable device may be made. It will be observed that this provides two strong discs, either of which may serve as a base, and the other as the support of the demonstrator. The discs are mounted to rotate freely, but the bearings are so distributed that the thrust is over a relatively wide area, the consequence being that even if the weight on the disc is not evenly distributed, the device will operate.

In demonstrating the conservation of angular momentum, the demonstrator places the device upon the floor and stands upon the disc with his arms outstretched, and preferably holds a weight (a pound or so) in each hand. His assistant sets him in slow rotation, and while the disc is turning, he lowers his hands quickly. This causes the speeding-up of rotation, which is slowed up when his arms are raised into the first position. The change in speed can readily be seen by any observer while of course the change in the tendency to produce rotation can easily be felt by the one who is standing on the disc.

The kinetic energy of rotation is expressed by the equation—$E_{rot}=\frac{1}{2}IW^2$—, the momentum by—$M_{rot}=\frac{1}{2}IW$—. In each of the equations, "I" equals the moment of inertia of the body in rotation and "W" equals the angular velocity of the body's rotation.

The "I" of the body here is the moment of inertia of the person standing on the disc. When his hands are held out, with his arms about horizontal, he keeps the "I" larger than it becomes when the arms are dropped to the side. If now, in one case, the kinetic energy, (E) is a definite quantity, or in the other case, (M), is a definite quantity, and the equations are to remain balanced, there must follow spontaneously a compensating increase in the "W", to make up for the decrease in "I", or in other words, with the dropping of the hands, there must follow at once a speeding-up of rotation, and with the raising of the hands, there must follow a slowing-up of the rotation.

These effects are strikingly shown by the device set forth above.

I claim:

1. A device for use in demonstrating the conservation of angular momentum or energy of rotation comprising a pair of circular flat discs, bearing plates carried by said discs, and having registering ball races, balls in said races, a central pivotal member for securing said discs together, each of said discs having a recess for receiving said central pivotal member, plates for covering each recess to provide a flat surface on the faces of the plates opposite the bearing portions, and an auxiliary bearing plate carried by said pivotal member within one of said recesses, and auxiliary antifriction devices between said auxiliary bearing plate and one of said first named bearing plates.

2. A device for use in demonstrating the conservation of angular momentum or energy of rotation comprising a pair of circular flat discs, bearing plates carried by said discs and having registering ball races, balls in said recesses, a central pivotal member for securing said discs together, each of said discs having a recess for receiving said central pivotal member, and plates for covering each recess to provide a flat surface on the faces of the plates opposite the bearing portions.

3. A device for use in demonstrating the conservation of angular momentum or energy of rotation comprising a circular base having an unbroken flat lower surface, a circular disc of substantially the same diameter as said circular base having an unbroken flat upper surface, and mounted to rotate about a vertical axis, and antifriction means between said base and said disc, said antifriction means being disposed in a ring concentric with said vertical axis, whereby said disc is kept from tilting when the center of gravity of the body on the disc is outside of the vertical axis.

4. A device for use in demonstrating the conservation of angular momentum or energy of rotation comprising a flat base, a flat disc of substantially the same area of the base and mounted thereon to rotate about a central vertical axis, and antifriction means disposed between said plate and said base at a distance from said central axis, whereby the plate is kept from tilting.

OLAF HOVDA.